F. P. GOODWIN.
CULTIVATOR.
APPLICATION FILED OCT. 24, 1911.

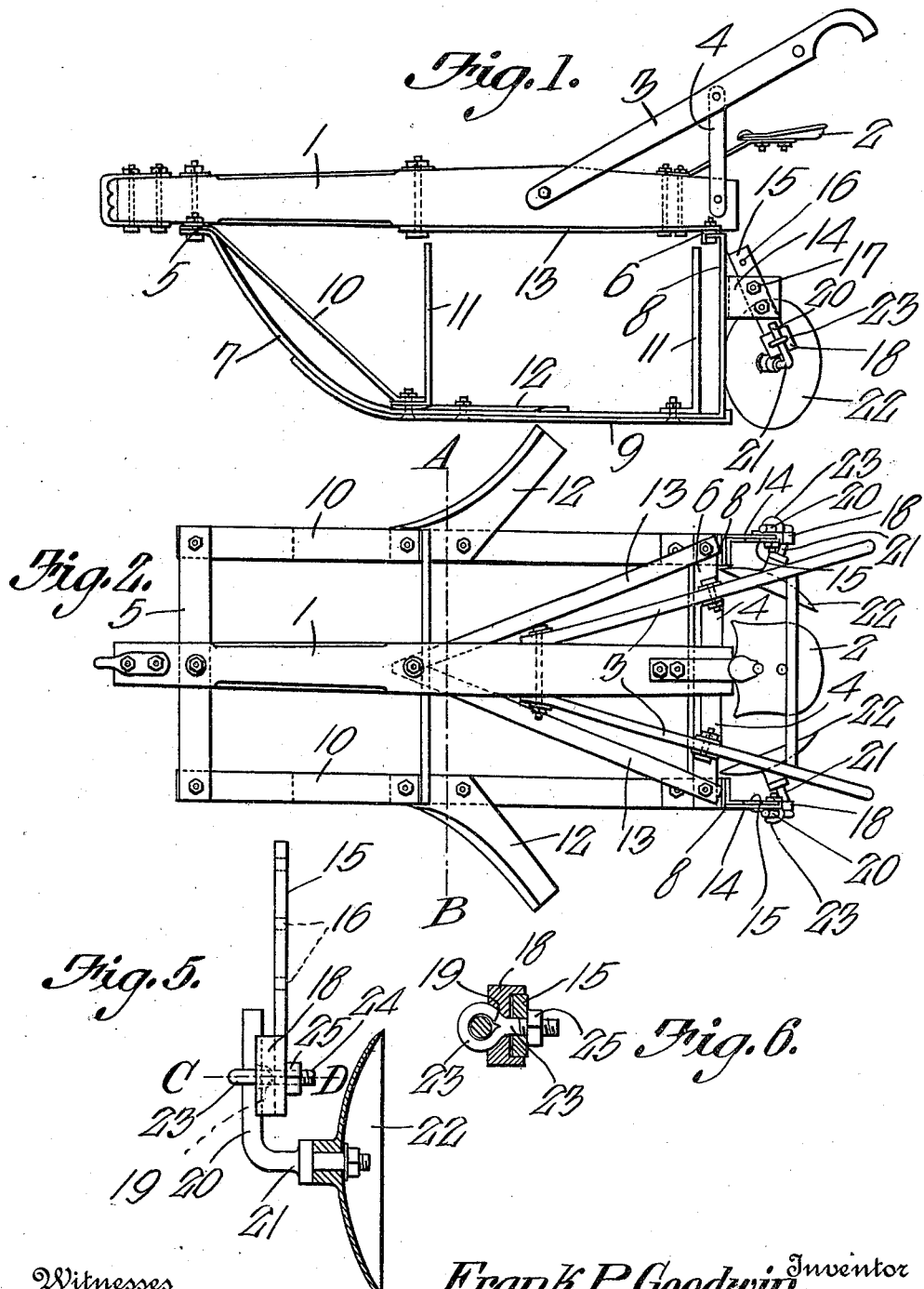

1,044,043.

Patented Nov. 12, 1912.

2 SHEETS—SHEET 2.

Witnesses
J. R. Tomlin
M. H. Martin.

Frank P. Goodwin, Inventor
By C. A. Snow & Co.
Attorneys.

UNITED STATES PATENT OFFICE.

FRANK P. GOODWIN, OF SAYRE, OKLAHOMA.

CULTIVATOR.

1,044,043.

Specification of Letters Patent. Patented Nov. 12, 1912.

Application filed October 24, 1911. Serial No. 656,348.

*To all whom it may concern:*

Be it known that I, FRANK P. GOODWIN, a citizen of the United States, residing at Sayre, in the county of Beckham and State of Oklahoma, have invented a new and useful Cultivator, of which the following is a specification.

This invention relates to cultivators, one of its objects being to provide a machine of this character mounted on runners instead of wheels and which is adapted to straddle a row, there being laterally and rearwardly diverging blades carried by the runners for cutting away weeds and other undesirable growths at the sides of the row.

A further object is to provide means whereby soil may be thrown against plants in the row, said means being adjustable relative to the runners.

A further object is to provide a cultivator which can be used either as a riding or a walking cultivator.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings the preferred form of the invention has been shown.

Figure 3:
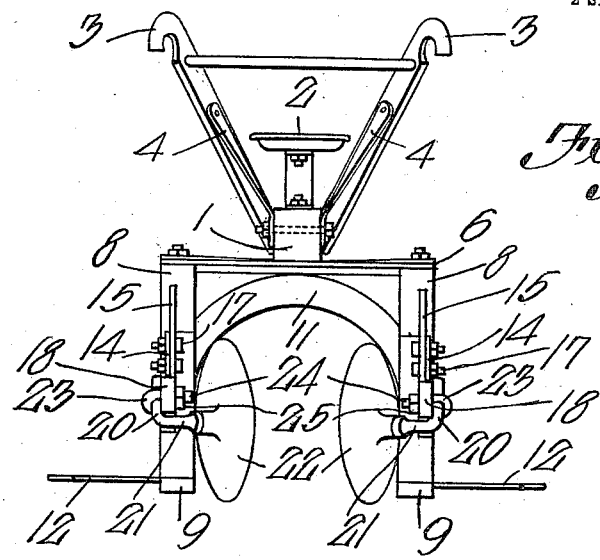
Figure 4:
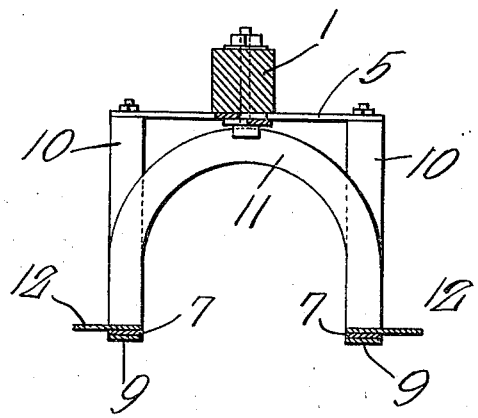

In said drawings:—Figure 1 is a side elevation of the cultivator. Fig. 2 is a plan view thereof. Fig. 3 is a rear elevation. Fig. 4 is a section on line A—B Fig. 2. Fig. 5 is an enlarged elevation of the adjustable colter standard, the colter being shown in section. Fig. 6 is a section on line C—D Fig. 5.

Referring to the figures by characters of reference 1 designates the main beam of the machine and, when it is desired to employ the said machine as a riding cultivator, a seat 2 may be mounted upon the rear end portion of the beam. Otherwise upwardly and rearwardly diverging handles 3 may be connected to the sides of the beam and provided with suitable supports 4.

The end portions of the beam 1 are secured to and bear downwardly on the middle portions of cross strips 5 and 6, the strip 5 being arranged near the front end of the beam and being secured, at its ends to the upper or front ends of runners 7 which curve downwardly and rearwardly and then extend rearwardly along straight lines, the rear ends of the runners having standards 8 projecting upwardly therefrom and secured to the end portions of the rear cross strip 6. Supplemental shoes 9 may be secured along the lower faces of the runners 7 so as to protect the runners from wear. The front curved portions of the runners 7 are preferably reinforced by means of straight braces 10 secured at their ends to the cross strip 5 and to the bottom portions of the runners respectively. Arches 11 are secured to the bottom portions of said runners and are adapted to straddle the row along which the cultivator is drawn, these arches serving to hold the runners properly spaced apart under all conditions. Cutting blades 12 are secured upon the runners 9 and the front or sharpened edges thereof diverge rearwardly so as to produce shearing cuts upon vegetation contacted thereby.

Diagonally disposed braces 13 are secured to the bottom of the beam 1 and are fastened, at their rear ends, to the ends of the rear cross strip 6. Brackets 14 are secured to and extend rearwardly from the standards 8 and each of these brackets is adjustably engaged by a standard 15 having a series of openings 16 therein any of which are adapted to receive fastening means such as shown at 17. A block 18 is formed on or secured to the lower end of each standard 15 and has a groove 19 in one face for the reception of a stem 20. This stem has an arm 21 extending at right angles therefrom and a colter disk 22 is mounted for rotation on said arm. Stem 20 projects through an eye 23 formed at one end of a bolt 24 which extends through the block 18 and has a tightening nut 25 mounted thereon. It will be apparent that, by means of this bolt, the stem 20 can be tightly bound against the block 18 and within the groove 19, said stem being thus held against longitudinal movement relative to the block and also being held against rotation. Obviously, by providing a connection such as described for attaching the colter to a bracket 14, the said colter can be raised or lowered relative to the runners 9 and can be turned to any desired angle relative to the path of movement of the machine.

When the machine is drawn forward, the runners 9 will travel at opposite sides of the row, the arches 11 permitting the plants to remain standing without injury. The rearwardly diverging cutting blades 12 will shear the weeds and other undesirable growths at the sides of the row and the colters 22 will operate to throw the soil against the plants. Should the shoes 7 become worn to an objectionable extent they can be readily removed and others substituted therefor.

It will be seen that a cultivator such as herein described is very simple in construction and that there are no parts which can readily get out of order.

What is claimed is:—

A cultivator including runners having upwardly extending front portions, standards upon the rear portions of the runners, cross strips connecting the front end portions of the runners and the standards respectively, a beam mounted on the cross strips, arched connections spaced from the beam and mounted on intermediate portions of the runners, shoes detachably mounted on the lower faces of the runners, brackets outstanding from the standards, a standard adjustably connected to each bracket, a longitudinally channeled block upon each of said last named standards, said block being adjustable longitudinally along the standard, a stem having an arm at one end, a colter disk journaled on the arm, and means for connecting the stem to the block for longitudinal and angular adjustment relative thereto.

In testimony that I claim the foregoing as my own, I have hereto affixed my signature in the presence of two witnesses.

FRANK P. GOODWIN.

Witnesses:
J. I. BRECKENRIDGE,
C. H. CLAY.